United States Patent

[11] 3,631,913

| [72] | Inventor | Jacques Boileau<br>Clermont-Ferrand, France |
|---|---|---|
| [21] | Appl. No. | 867,225 |
| [22] | Filed | Oct. 17, 1969 |
| [45] | Patented | Jan. 4, 1972 |
| [73] | Assignee | Compagnie Generale Des Etablissements<br>Michelin raison sociale Michelin & Cie<br>Clermont-Ferrand, France |
| [32] | Priority | Oct. 25, 1968 |
| [33] | | France |
| [31] | | 171540 |

[54] PNEUMATIC TIRE
15 Claims, 7 Drawing Figs.

[52] U.S. Cl. .................................... 152/353, 152/354
[51] Int. Cl. .................................... B60c 3/00
[50] Field of Search .......................... 152/353, 354, 362

[56] References Cited
UNITED STATES PATENTS

| 2,186,178 | 1/1940 | Shoemaker | 152/362 |
| 3,253,636 | 5/1966 | Travers | 152/354 |
| 3,292,681 | 12/1966 | Travers | 152/354 |

FOREIGN PATENTS

| 20,603 | 0/1934 | Australia | 152/353 |

*Primary Examiner*—Arthur L. La Point
*Assistant Examiner*—Robert Saifer
*Attorney*—Brumbaugh, Graves, Donohue & Raymond ABSTRACT: A pneumatic tire having substantially the same width near the tread as near the beads is provided with sidewalls each comprising two distinct portions. A first portion of each sidewall, occupying most of the radial sidewall height, extends radially inwardly from the tread and slopes axially outwardly. This portion has a meridian profile that is substantially straight. A second portion of each sidewall extends from the radially inner edge of the first portion to the bead and has a meridian profile that is strongly curved.

3,631,913

INVENTOR.
JACQUES BOILEAU

BY Brumbaugh, Graves, Donohue & Raymond his ATTORNEYS.

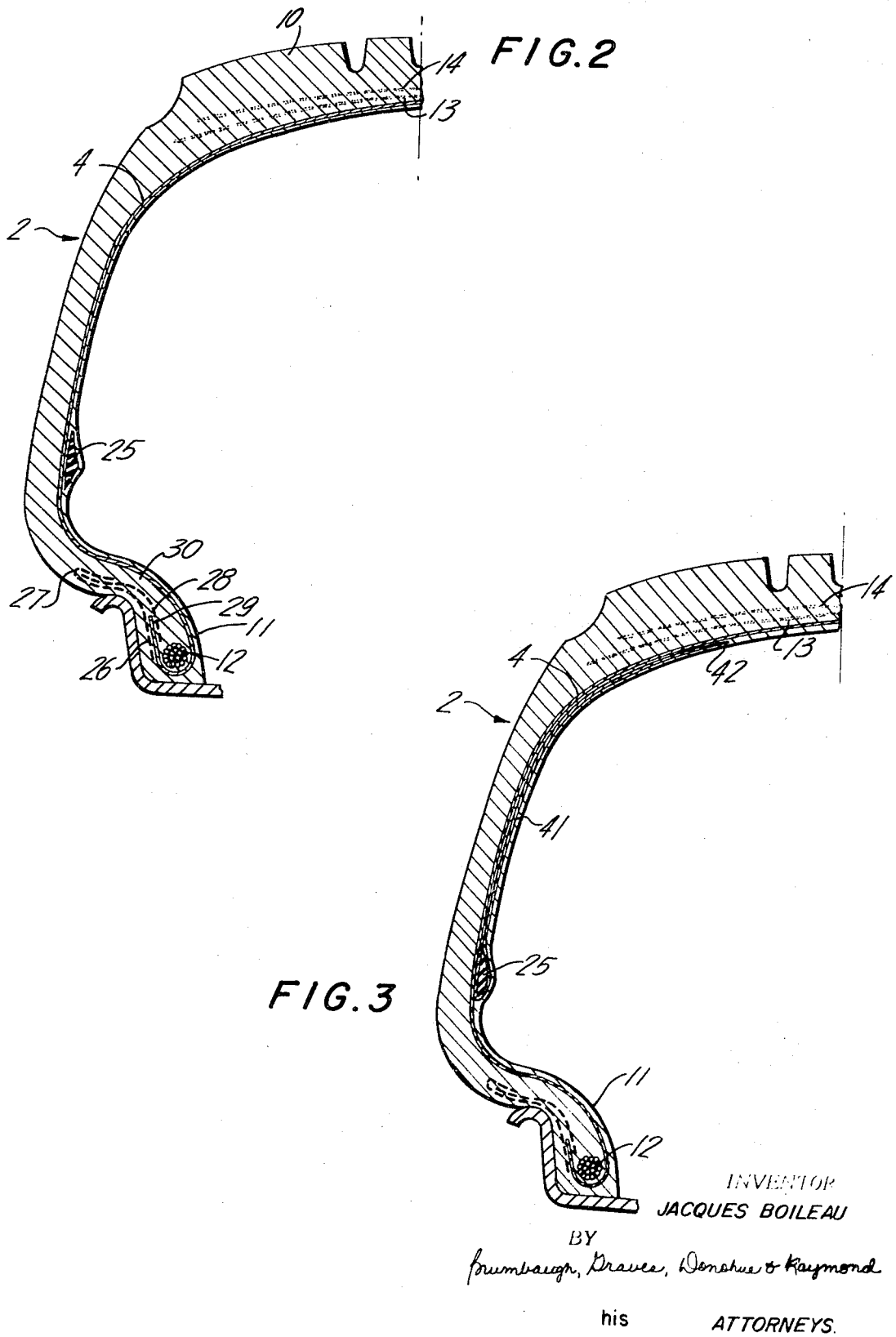

PATENTED JAN 4 1972
3,631,913
SHEET 3 OF 3
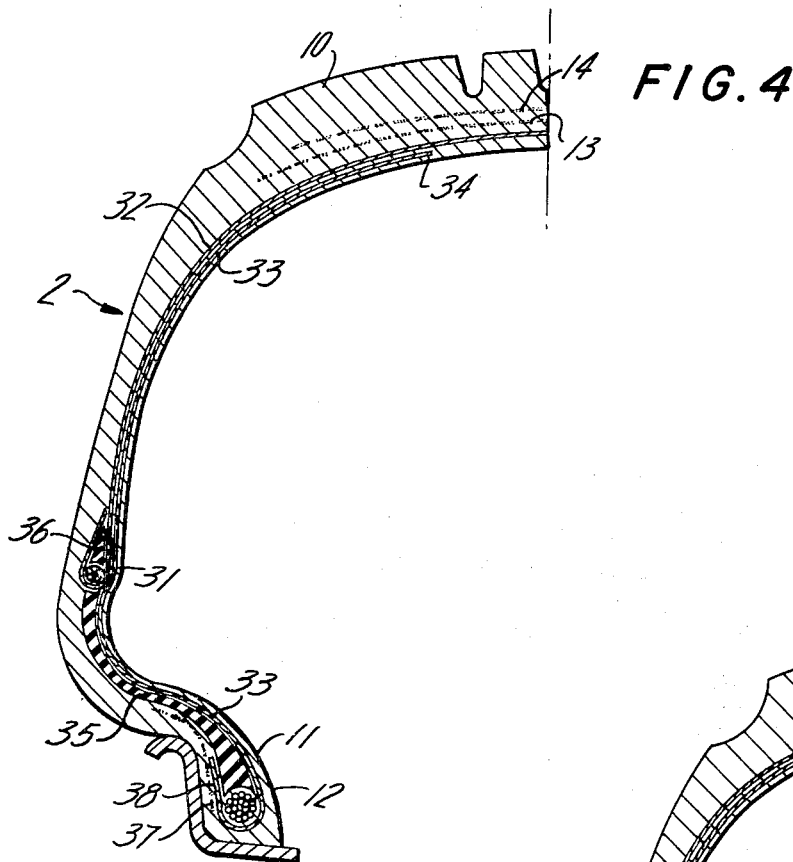
FIG.4
FIG.5
FIG.6
INVENTOR.
JACQUES BOILEAU
BY
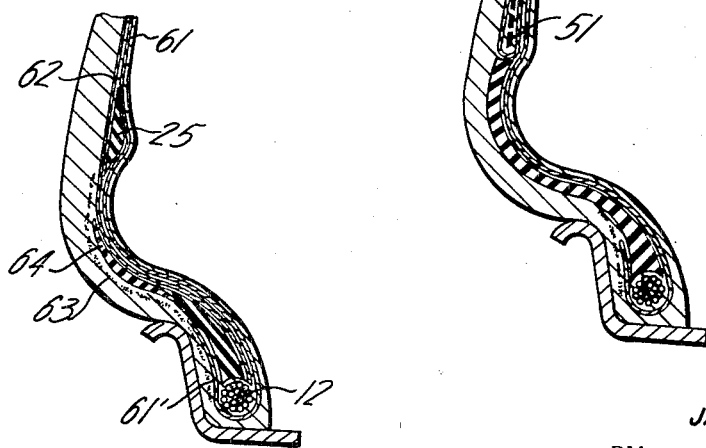
his ATTORNEYS.

PNEUMATIC TIRE

BACKGROUND OF THE INVENTION

This invention relates to pneumatic tires and, more particularly, to novel and highly effective pneumatic tires characterized by the structure and meridian profile of their sidewalls.

It is recognized by those skilled in the art that substantial progress was made in the design of tires by the discovery and development of the kind of tire having a radical carcass. This kind of tire, the original form of which is disclosed in French Pat. No. 1,001,585, combines the rigidity of a tread reinforced by the stiffest possible crown reinforcement with the flexibility of radial-wire-strengthened sidewalls. Tires of this kind definitely surpass in safety, comfort and resistance to wear and tear the crossed-carcass-type tire which has almost uniform rigidity in all its parts as well as the crossed-carcass-type tire provided with a tread reinforcement.

It has been found, however, that it is advisable to proportion the degree of rigidity of the tread and the degree of flexibility of the sidewalls. It is essentially the radial compressibility and extensibility it imparts to the tire that renders the flexibility of the sidewall advantageous. Indeed, a reduction of the lateral or longitudinal rigidity or the torsional stiffness of the sidewalls combined with an increase in the rigidity of the crown presents disadvantages: under certain conditions the tire becomes uncomfortable, and it responds to the action of the steering wheel only after a comparatively great delay; and, on the other hand, it is too sensitive to the stresses from the road transmitted by the tread. These disadvantages are alleviated if the rigidity of the crown is reduced.

In order not to lose the advantages connected with a great rigidity of the tread and to obtain tires capable of a high level of performance, it is advisable to increase the rigidity of the sidewalls without, however, sacrificing their radial extensibility and compressibility. Too great a reduction of radial extensibility and compressibility renders the tire uncomfortable due to excessive overall rigidity.

Various expedients have been proposed for increasing sidewall rigidity without sacrificing their extensibility and compressibility. The conventional expedients generally involve reinforcing one or another region of the sidewall but not all of the sidewall so as to preserve maximum radial extensibility and compressibility. One of the best solutions, given wide use, is disclosed, for example, in French Pat. No. 1,355,014 and its addition number 85,107. However, in the known solutions, the increased rigidity of the sidewalls still manifests itself in a certain decrease of radial extensibility and compressibility in relation to the extensibility and compressibility of the original radial-type tire disclosed in French Pat. No. 1,001,585.

SUMMARY OF THE INVENTION

An object of the invention is to remedy the deficiencies of conventional tires and, in particular, to provide a tire, especially a radial-type tire, the sidewalls of which have greater longitudinal, lateral and torsional rigidity than conventional tires and also have a radial extensibility and compressibility equal to or greater than the extensibility and compressibility of the sidewalls of conventional tires. The point is to make it possible to benefit fully from the rigidity of the tread, or even to increase this rigidity, without rendering the tire uncomfortable or stiff and even while increasing comfort. Indeed, it has been found that a suitable choice of the meridian profile of the tire makes it possible to increase at the same time the radial extensibility and compressibility of the sidewalls and their torsional stiffness and possibly their lateral and longitudinal rigidity. In other words, the invention makes it possible to gain in comfort and in the performance of the tire on the road.

The foregoing and other objects of the invention are attained by the provision of a tire which is of substantially equal axial width at the level of the tread and at the level of the beads on the rim. The tire is characterized in that each of its sidewalls when inflated comprises one portion adjacent to the tread which extends from the tread to a position beyond the midheight of the sidewall, deviates progressively from the median plane of the tire and has a meridian profile which is comparatively little curved, and another portion, radially between the former portion and the bead or end of the sidewall designed to make contact with the rim, such latter portion having a radially lower height, similar to the radial height of the bead, and having a comparatively much more curved meridian profile.

As can be seen, the sidewall comprises in the zone extending radially between the tread and the bead two clearly different portions. Starting at the tread and extending over a radial height in excess of half of the sidewall height of the tire, the sidewall has a flat meridian profile, the width of the tire increasing in the direction from the tread to the bead. This flat portion of the sidewalls provides rigidity and, if it were connected directly to the bead, the tire would have excellent qualities on the road but little radial elasticity and would thus be uncomfortable. The second portion of the sidewall with the curved profile forms a gusset or pneumatic spring and imparts to the sidewall increased radial extensibility and compressibility and consequently to the tire a likewise increased radial elasticity.

A significant difference between a tire in accordance with the invention and conventional tires can thus be seen: the latter have sidewalls with a profile moderately curved over all of their height and, consequently, the sidewalls play in their entirety the part of a gusset. In accordance with the invention, in contrast, the role of a gusset is limited to the portion of the sidewall that has a strongly curved profile adjacent to the bead. Thus, there is available a gusset of small height but of strongly pronounced curvature. Such structure has a less unfavorable effect on the torsional stiffness of the sidewalls than a gusset of great height. The effect of the gusset of a tire in accordance with the present invention on radial elasticity is as favorable as or even more favorable than is the effect of the sidewalls of a conventional tire.

In one preferred embodiment of the invention, the sidewall comprises at the junction of the comparatively little curved region and the comparatively strongly curved region a localized reinforcement. Such localized reinforcement consists of any suitable means, for example, a ring-shaped rod, one or more narrow plies of wires, or a strand of comparatively hard rubber (Shore A hardness at least about 75°). This reinforcement is of course placed in a parallel of the tire sidewall which has a larger diameter than that of the tire bead wire which in the customary manner strengthens the bead, and it is laterally or axially offset towards the outside of the tire in relation to the tire bead wire. By thus marking the junction between the sidewall portions with different meridian profiles, one establishes the radial and axial coordinates at which the junction is located as well as the radial heights over which the two sidewall portions extend. The reinforcement may also serve to anchor one or more sidewall plies extending over the flat profiled portion or also one or more carcass plies extending from sidewall to sidewall and passing underneath the tread.

The point of change of profile may be located at a radial distance from the base of the bead ranging from one-fifth to one-half of the inside radial height of the inflated tire. It is desirable that the point be approximately at one-third of said inside height. Of course, it is possible to give the two sidewalls an asymmetric structure by placing the point of change from one kind of profile to the other at different levels in the two sidewalls.

Preferably, the sidewall portion with the strongly curved profile describes in meridian cross section an arc the angle of which measured with respect to the center of the arc, exceeds substantially 90° so that the axially farthest projecting point of the tire is located in this strongly curved portion of the sidewall.

It is not necessary that the portion of the sidewall with the strongly curved profile be connected to the bead by means of a cylindrical border having considerable axial width. Rather, it is preferable that the portion of the sidewall with the strongly curved profile be connected directly to the bead. In this manner, the meridian development of the tire and its carcass is not considerably lengthened in relation to that of a tire with a conventional meridian profile. This elongation in the strongly curved portion is limited by the small radial height and the small axial width of this portion. Furthermore, the elongation in the strongly curved portion is compensated to some extent by the shortening in the slightly curved portion of the sidewall. Altogether, the lengthening of the meridian development does not exceed 10% and may be even less than 5% of the meridian development of a conventional tire with the customary sidewall profile.

The sidewall portion with the strongly curved profile preferably comprises, at least over part of its meridian development, a reinforcement which is added to the normal wires of the sidewall plies or carcass plies so as to adjust the resistance of this sidewall portion to a variation in the curvature. Towards such end, one may use one or more plies of wires, which can be metal wires. The wires are inclined with respect to the radial planes of the tire. The wires of all the plies can be oriented in one direction, or the wires of the various plies can be oriented in different directions. Or, an extra thickness of either hard or soft rubber may be used. These plies may be separated from the carcass by a thickness of rubber equaling one or more times the thickness of one ply, so as to increase the rigidity of the reinforcement and serve as a shock absorber. The plies may extend into the bead and be anchored there by juxtaposition with the portion of a carcass ply turned back around the tire bead wire or with a special ply reinforcing the bead.

It is desirable but not necessary that a tire constructed in accordance with the invention be of the radial kind: i.e., the kind having in its sidewalls a reinforcement formed of cords placed in radial planes and, under the tread, a peak reinforcement formed of at least two plies of cords, the cords of the several plies being oriented in different directions, whereby said cords are triangulated either by the cords of a third peak ply or by the portions of the carcass cords which are prolongations of the sidewall cords.

Applied to a radial carcass tire, the invention makes it possible to increase the rigidity of the tread either by using a more rigid crown reinforcement or by increasing the inflation pressure, the latter without loss of comfort, since the special profile facilitates the improvement of its torsional stiffness and radial elasticity at the same time. In the case of the radial carcass tire, the modification of the profile of the sidewalls by itself permits the improvement of the seat of the tire on the ground. The bulges on the sides of the sidewalls near the ground on either side of the surface of contact ("rabbit's pouch") that characterize conventional radial tires have a tendency to flatten out in tires constructed in accordance with the invention. Furthermore, the surface of the tire of the invention in contact with the ground, instead of having the shape of an ellipse, assumes a shape which is closer to the shape of a rectangle of the same surface area as the ellipse. Thus, the zone of the sidewall which provides radial elasticity is transferred from the region of the sidewall adjacent to the tread to the region thereof adjacent to the bead, and the interaction between the tread and the sidewalls is diminished by the increased elasticity of the sidewalls in the portions adjacent to the bead.

BRIEF DESCRIPTION OF THE DRAWING

An understanding of additional aspects of the invention can be gained from a consideration of the following detailed description of several representative embodiments thereof, in conjunction with the figures of the drawings, wherein:

FIGS. 2-5 are views similar to FIG. 1 showing additional embodiments of the invention; and FIG. 6 is a view, likewise in axial section, of the lower part of a sidewall of another embodiment of the invention.

DESCRIPTION OF THE PREFERRED EMBODIMENTS

Figure 1A:
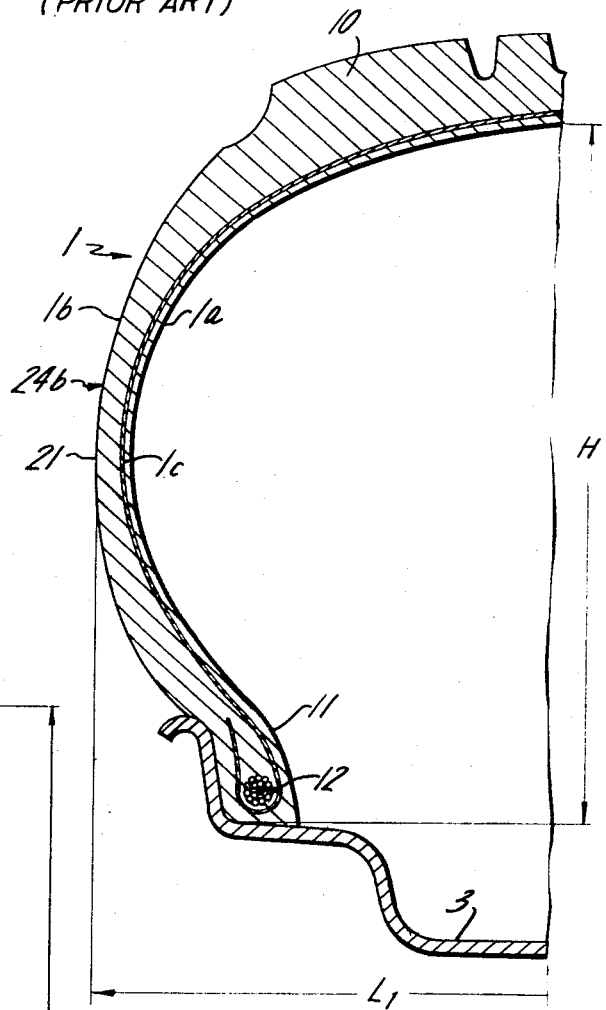
FIG. 1A is a view similar to FIG. 1 showing a conventional tire casing.
Figure 1:
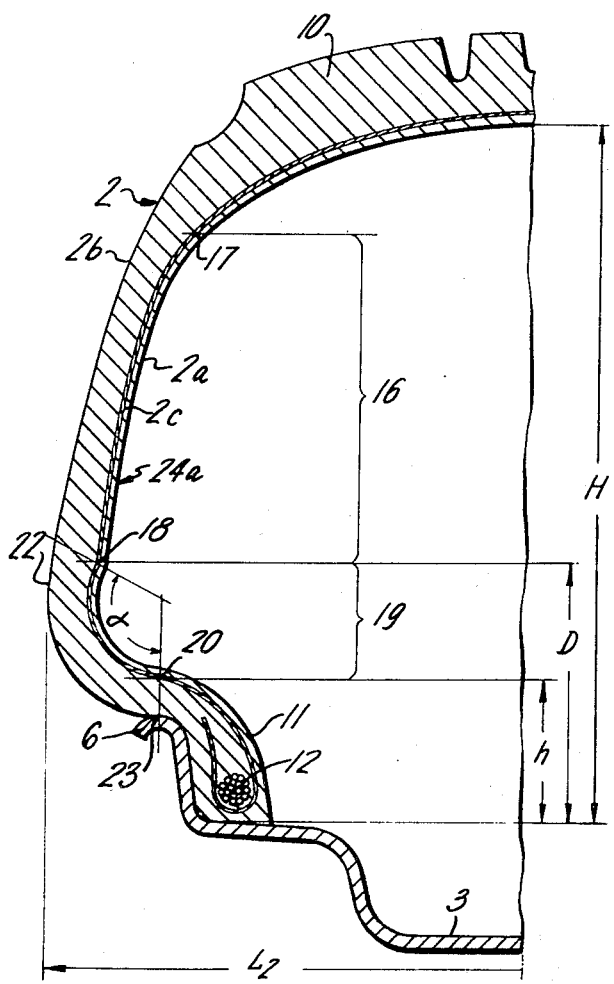
FIG. 1 is a half-meridian axial section of a tire casing constructed in accordance with the invention.

FIG. 1A shows a half-meridian axial section of a conventional tire 1, and FIG. 1 a corresponding section of a tire 2 in accordance with the invention. These figures show the contours of the inside and outside surfaces of the two tires as well as the outline of the center fiber of the carcass ply or plies.

In the drawing we see the conventional tire 1 and the tire 2 in accordance with the invention, defined respectively by their inner walls 1a and 2a and outer walls 1b and 2b and by the center fiber 1c and 2c of the carcass ply, in the outline assumed by these walls and fibers when the tires are normally inflated but not loaded, and placed on a rim 3 of normal shape and measurements. The identical parts in the two tires are the tread 10 and the bead 11 which contains a ring-shaped bead wire 12.

The tire 2 in accordance with the invention comprises a sidewall 24a whose profile is clearly different from the substantially uniformly curved profile of the sidewall 24b of the conventional tire. The sidewall 24a has one portion 16 extending between points 17 and 18 with less curvature, and a second portion 19 which is strongly curved and extends between points 18 and 20. The point 17 where the sidewall starts is located in a radial carcass tire at the edge of the peak reinforcement (not shown), i.e., at a point at the same axial coordinate as the point of the maximum diameter 23 of the lateral edge 6 of the rim.

The point 18 forming a singular point of the meridian profile of the sidewall 24a is separated from the base of the bead by a distance D which, measured radially, is substantially less than half of the interior radial height H of the tire, and is a little less than double the radial height $h$ of the bead.

While in the conventional tire 1 the point of the greatest axial width of the tire is at 21, substantially at midheight of the sidewall, this point is at 22 in the tire in accordance with the invention, i.e., in the portion 19 extending between points 18 and 20. The maximum width $L_2$ of the tire 2 in accordance with the invention is not considerably larger than the maximum width $L_1$ of the conventional tire 1. The same applies to the ratio $H/L_2$ which is hardly different from the ratio $H/L_1$.

The strongly curved portion 19 extends to an inflection point or point of change of curve 20 substantially at the same axial coordinate as the point of maximum diameter 23 of the edge 6 of the rim. At this point 20, the profile of the tire 2 is substantially tangential to the axial direction. Of course, under the influence of a load, of a variation in pressure or of stresses to which the tire may be subjected while rolling, this point of inflection may shift and the tangent to the profile of the tire in this point may be inclined in relation to the axial direction. The substantially circular arc described by the center fiber of the carcass ply or plies of the tire between the singular point 18 and the point of change of curve 20 extends over an angle $\alpha$ which is greater than 90°.

Because of the profile described, the tire 2 comprises on the one hand a portion 16 which is flatter and more rigid than the corresponding portion of the tire 1, i.e., than that portion of the latter which extends between the point 17 and a point located at the same radial distance from the axis of rotation of the tire as point 18, and on the other hand a portion 19 which is radially more extensible and compressible than the corresponding portion of the tire 1 because it is more curved.

Tests conducted with tires having the profile of the tire 2 in FIG. 1 have shown that these tires absorb much better shocks and impacts occurring while rolling on highways with deteriorated or partly destroyed casings, that they respond to the action of the steering wheel faster than do tires of the radial carcass kind having the profile of tire 1 in FIG. 1A, and that they are more stable without loss of comfort.

FIGS. 2–6 illustrate the inner structure of various tires with a profile in accordance with the invention such as in tire 2 (FIG. 1).

In FIG. 2 we see a tire 2 comprising a tread 10, a bead 11 equipped with a ring-shaped bead wire 12 and, underneath the tread, a peak reinforcement comprising two plies of crossed cords 13 and 14. This tire also contains a ply 4 of radial cords turned back around bead wires 12. The singular point 18 shown in FIG. 1 in this example takes the form of a ring-shaped rubber cord 25 placed on the inside of the ply 4. Since the rubber cord 25 by itself might be insufficient to maintain the desired profile, the strongly curved portion of the sidewall is reinforced by a stiffening ply 26 which is doubled at 27, and a stiffening ply 28 comprising cords parallel to those of the ply 26. These plies 26 and 28 are positioned on either side of the end 29 of the carcass ply 4 and are separated from the carcass ply 4 by a thick rubber layer 30. The plies 26 and 28 form a radially extensible and compressible aggregate which, however, makes it possible to preserve for the tire, acted on by the inflation pressure and by the load, a meridian profile with a pronounced curvature in the portion 19 (FIG. 1) next to the rim.

The tire 2 shown in FIG. 3 resembles the tire shown in FIG. 2. However, in the embodiment of FIG. 3, the annular rubber cord 25 is surrounded by a ply of radial cords 41 which rises as far as a point 42 underneath the carcass ply 4 and underneath the crown plies 13 and 14.

In FIG. 4, the tire 2 comprises, at the height of the singular point 18 of FIG. 1, an annular rod 31. The carcass of the tire comprises a ply of radial cords 32 the ends of which are turned back around the tire rod 31 in the sidewall shown and around a corresponding tire wire located in the sidewall not shown. The center part of this ply extends uninterruptedly underneath the tread 10. The carcass of the tire comprises also, in each sidewall, a ply 33 which likewise consists of radial cords and is turned back around the bead wire 12 in the bead 11. This ply 33 is located on the inside in relation to the tire rod 31 and the ply 32 and it ends at a point 34 underneath the crown plies 13 and 14. Layers 35 and 36 of comparatively hard rubber are provided between the rods 12 and 31 (layer 35) and above the rod 31 (layer 36). Finally, the bead 11 is reinforced by a narrow ply 37 placed axially on the outside in relation to the turned-back portion 38 of the ply 33.

The tire represented in FIG. 5 is similar to the one in FIG. 4. However, in the embodiment of FIG. 5, the tire rod 31 and the layer 36 of comparatively hard rubber are replaced by a narrow ply 51 of metal wires which are slightly inclined with respect to the circumferential direction of the tire.

In the embodiment shown in FIG. 6, the carcass comprises two plies 61 and 62 of radial cords. The ply 61 extends uninterruptedly from one bead to the other of the tire and is turned back around the bead wire 12 while the radially inner end of the ply 62 is positioned in the proximity of the bead wire 12 without being turned back around the latter and the radially outer end thereof is located underneath the crown plies 13 and 14 (not shown). In this embodiment of the invention, the singular point 18 takes the same shape as in the embodiment represented in FIG. 2, i.e., that of an annular rubber cord 25. The ply 61 passes this cord on the axially interior side while the ply 62 skirts it on the axially exterior side.

Axially outside the plies 61 and 62, the portion of the sidewall extending between the bead wire 12 and the rubber cord 25 is reinforced by a ply 63 preferably comprising metal wires. Between this ply 63 and the carcass ply 62 is placed a rubber layer 64 the composition of which is similar to that of the cord 25.

In an embodiment not shown, the turned-back portion 61' of the ply 61 extends to the vicinity of the cord 25.

It goes without saying that the invention is not limited to the means described in FIGS. 1–6 for easily obtaining during manufacture, and subsequently preserving, the desired profile of the sidewalls of the tire. Rather, it encompasses all variants of practical execution making it possible to obtain a sidewall profile which is curved only slightly between the tread and a point of change of profile comparatively close to the bead and is then strongly curved between the latter point and the bead.

Many modifications within the spirit and scope of the invention of the representative embodiments disclosed herewith will readily occur to those skilled in the art, and the invention is to be construed to include all of the embodiments thereof within the scope of the appended claims.

I claim:

1. A tire casing having a tread portion for receiving a tread, a pair of bead portions for mounting on a rim, and a pair of sidewalls, one of said sidewalls extending between one edge of said tread portion and one of said bead portions and the other of said sidewalls extending between the other edge of said tread portion and the other of said bead portions, said tire casing having substantially the same axial width adjacent to said tread portion as adjacent to said bead portions, and each of said sidewalls comprising, when inflated, a first portion adjacent to said tread portion and extending to a location beyond the midheight of said sidewall, said first portion being inclined with respect to the median plane of said tire casing and having a substantially straight meridian profile, and a second portion between said first portion and the adjacent bead portion, said second portion having a meridian profile curved substantially as a section of a circle and extending radially outward from said adjacent bead portion in such a manner as to be progressively more distant from the axis of said tire at increasing distances from said bead portion, further comprising in at least one of said sidewalls at the junction between the substantially straight first portion and the substantially circularly curved second portion a localized reinforcement.

2. A tire casing in accordance with claim 1 wherein said localized reinforcement comprises an annular rod.

3. A tire casing in accordance with claim 1 wherein said localized reinforcement comprises an annular narrow ply of cords.

4. A tire casing in accordance with claim 1 wherein said localized reinforcement comprises an annular cord of hard rubber.

5. A tire casing in accordance with claim 1 wherein said localized reinforcement is in a parallel of a larger diameter than that of said bead portion and is offset axially towards the outside of said tire casing in relation to the said bead portion.

6. A tire casing in accordance with claim 1 comprising at least one ply located at least partly in said one sidewall having said localized reinforcement and anchored to said localized reinforcement.

7. A tire casing in accordance with claim 1 comprising a bead wire in each of said bead portions and cords extending between said localized reinforcement and the nearer of said bead wires, said cords having a length exceeding the distance separating said nearer bead wire and said localized reinforcement.

8. A tire casing in accordance with claim 1 wherein in each sidewall the junction between the substantially straight first portion and the substantially circularly curved second portion is at a radial distance from the base of said bead portions ranging from one-fifth to one-half of the interior radial height of the tire casing.

9. A tire casing in accordance with claim 8 wherein said radial distance is substantially one-third of said interior radial height.

10. A tire casing in accordance with claim 1 wherein in each sidewall the substantially circularly curved second portion describes in its meridian cross section an arc the center angle of which substantially exceeds 90°.

11. A tire casing in accordance with claim 1 wherein the maximum axial width of the tire casing extends between points of the two sidewalls contained in the substantially circularly curved second portions.

12. A tire casing in accordance with claim 1 comprising in at least one sidewall at least one ply of cords and an additional reinforcement in at least part of the substantially curved second portion.

13. A tire casing in accordance with claim 12 wherein said additional reinforcement comprises at least one ply of cords.

14. A tire casing in accordance with claim 12 wherein said additional reinforcement comprises an extra thickness of rubber.

15. A tire casing in accordance with claim 12 wherein said additional reinforcement is spaced apart from said ply in said one sidewall.

* * * * *